United States Patent
Hillan

(10) Patent No.: US 11,272,358 B2
(45) Date of Patent: Mar. 8, 2022

(54) NEAR FIELD COMMUNICATION FORUM DATA EXCHANGE FORMAT (NDEF) MESSAGES

(71) Applicant: QUALCOMM Incorporated, San Diego, CA (US)

(72) Inventor: John Hillan, Alton (GB)

(73) Assignee: QUALCOMM INCORPORATED, San Diego, CA (US)

( * ) Notice: Subject to any disclaimer, the term of this patent is extended or adjusted under 35 U.S.C. 154(b) by 321 days.

(21) Appl. No.: 16/188,189

(22) Filed: Nov. 12, 2018

(65) Prior Publication Data

US 2020/0015072 A1    Jan. 9, 2020

Related U.S. Application Data

(60) Provisional application No. 62/694,614, filed on Jul. 6, 2018.

(51) Int. Cl.
*H04W 12/03*    (2021.01)
*H04W 4/80*    (2018.01)
(Continued)

(52) U.S. Cl.
CPC .......... *H04W 12/03* (2021.01); *H04B 5/0031* (2013.01); *H04L 9/30* (2013.01);
(Continued)

(58) Field of Classification Search
CPC ......... H04W 12/001; H04W 12/04071; H04W 12/00407; H04W 4/80; H04W 76/11;
(Continued)

(56) References Cited

U.S. PATENT DOCUMENTS

| 2013/0065521 A1* | 3/2013 | Jang | G06K 7/10237 |
| | | | 455/41.1 |
| 2013/0291056 A1* | 10/2013 | Gaudet | H04W 12/06 |
| | | | 726/1 |
| 2015/0188712 A1* | 7/2015 | Teuwen | H04W 12/1006 |
| | | | 713/176 |

OTHER PUBLICATIONS

S. Hameed, U. M. Jamali and A. Samad, "Protecting NFC data exchange against eavesdropping with encryption record type definition," NOMS 2016—2016 IEEE/IFIP Network Operations and Management Symposium, Istanbul, 2016, pp. 577-583 [online][retrieved on Aug. 6, 2020]. Retrieved from: IEEEXplore (Year: 2016).*

(Continued)

*Primary Examiner* — Jung W Kim
*Assistant Examiner* — Sangseok Park
(74) *Attorney, Agent, or Firm* — Arent Fox, LLP

(57) ABSTRACT

In an aspect of the disclosure, a method, a computer-readable medium, and an apparatus are provided. In certain implementations, the apparatus may establish at least one encryption key with a second device. The apparatus may generate an NDEF message. In certain aspects, the NDEF message may include one or more NDEF records. In certain other aspects, each of the one or more NDEF records may include an NDEF record header and an NDEF record payload. The apparatus may encrypt the NDEF message based at least in part on the at least one encryption key such that the NDEF record payload of each of the one or more NDEF records is encrypted and the NDEF record header of each of the one or more NDEF records is unencrypted. The apparatus may transmit the NDEF message to the second device upon encryption.

40 Claims, 12 Drawing Sheets

(51) Int. Cl.
  *H04B 5/00* (2006.01)
  *H04L 9/30* (2006.01)
  *H04L 29/06* (2006.01)
  *H04W 12/0471* (2021.01)

(52) U.S. Cl.
  CPC .......... *H04L 63/0435* (2013.01); *H04W 4/80* (2018.02); *H04W 12/0471* (2021.01); *H04L 2209/80* (2013.01)

(58) Field of Classification Search
  CPC . H04W 12/47; H04W 12/03; H04W 12/0471; H04B 5/0031; H04L 9/30; H04L 63/0435; H04L 2209/80; H04L 63/0428; G06F 21/31
  See application file for complete search history.

(56) References Cited

OTHER PUBLICATIONS

Standard ECMA-385. Nfc-sec: Nfcip-1 security services and protocol also approved as iso/iec 13157-1. [online][retrieved on Aug. 6, 2020]. Retrieved from: https://www.ecma-international.org/publications/standards/Ecma-385.htm (Year: 2015).*

Standard ECMA-386. Nfc-sec-01: Nfc-sec cryptography standard using ecdh and aes also approved as iso/iec 13157-2. [online][retrieved on Aug. 6, 2020]. Retrieved from: https://www.ecma-international.org/publications/standards/Ecma-386.htm (Year: 2015).*

Hameed S., et al., "Protecting NFC Data Exchange against Eavesdropping with Encryption Record Type Definition", NOMS 2016—2016 IEEE/IFIP Network Operations and Management Symposium, IEEE, Apr. 25, 2016, XP032918153, DOI: 10.1109/NOMS.2016.7502861 [retrieved on Jun. 30, 2016] abstract, I. Introduction, IV. ERTD Middleware Design and Prototype Implementation, IV.A. NFC Writer, IV.B. NFC Reader, figures 3, 4, pp. 577-583.

International Search Report and Written Opinion—PCT/US2019/032254—ISA/EPO—dated Sep. 20, 2019.

NFC Forum, "NFC Data Exchange Format (NDEF)—NDEF 1.0", Internet Citation, Jul. 24, 2006 (Jul. 24, 2006), XP002413994, pp. 1-21, Retrieved from the Internet: URL:http://www.nfc-forum.org/specs/spec_license/downlOad_spec/0f5678c114d295e2da0d902f4e7839846281fc44/NFCForum-TS-NDEF_1.0.pdf [retrieved on Jan. 10, 2007] section 3.2.

Shen J., et al., "A Proposed Architecture for Building NFC Tag Services", 2013 Sixth International Symposium on Computational Intelligence and Design, IEEE, vol. 2, Oct. 28, 2013, XP032590399, DOI: 10.1109/ISCID.2013.126 [retrieved on Apr. 23, 2014] abstract, I. Introduction, III. Data Access Layer, III. C. Data Encryption & Decryption, figures 3, 4, pp. 48-52.

\* cited by examiner

NEAR FIELD COMMUNICATION FORUM DATA EXCHANGE FORMAT (NDEF) MESSAGES

CROSS-REFERENCE TO RELATED APPLICATION(S)

This application claims the benefit of U.S. Provisional Application Ser. No. 62/694,614, entitled "NEAR FIELD COMMUNICATION FORUM DATA EXCHANGE FORMAT (NDEF) MESSAGES" and filed on Jul. 6, 2018, which is expressly incorporated by reference herein in its entirety.

BACKGROUND

Field

The present disclosure relates generally to communication systems, and more particularly, to the communication of Near Field Communication (NFC) Forum Data Exchange Format (NDEF) messages.

Background

Advances in technology have resulted in smaller and more powerful personal computing devices. Personal computing devices include wireless handheld devices such as smart phones and tablet devices. Wireless handheld devices are configured to operate within wireless communication systems, and are widely deployed to provide various telecommunication services such as telephony, video, data, messaging, and broadcasts. Further, wireless handheld devices may be configured to communicate using a variety of frequencies and applicable coverage areas, such as cellular communications, wireless local area network (WLAN) communications, NFC, etc.

NFC is a set of short-range wireless technologies, typically requiring a "near-field" separation, e.g., of 10 cm or less. NFC may involve an initiator and a target; the initiator actively generates an RF field that can power a passive target. The target may then transmit one or more messages to the initiator using the power of the RF field. This enables NFC targets to take low-complexity form factors such as unpowered tags, stickers, key fobs, or cards, etc. NFC peer-to-peer communication is also possible. There exists a need for further improvements in NFC technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In certain implementations, the apparatus may establish at least one encryption key with a second device. The apparatus may generate an NDEF message. In certain aspects, the NDEF message may include one or more NDEF records. In certain other aspects, each of the one or more NDEF records may include an NDEF record header and an NDEF record payload. The apparatus may encrypt the NDEF message based at least in part on the at least one encryption key such that the NDEF record payload of each of the one or more NDEF records is encrypted and the NDEF record header of each of the one or more NDEF records is unencrypted. The apparatus may transmit the NDEF message to the second device upon encryption.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
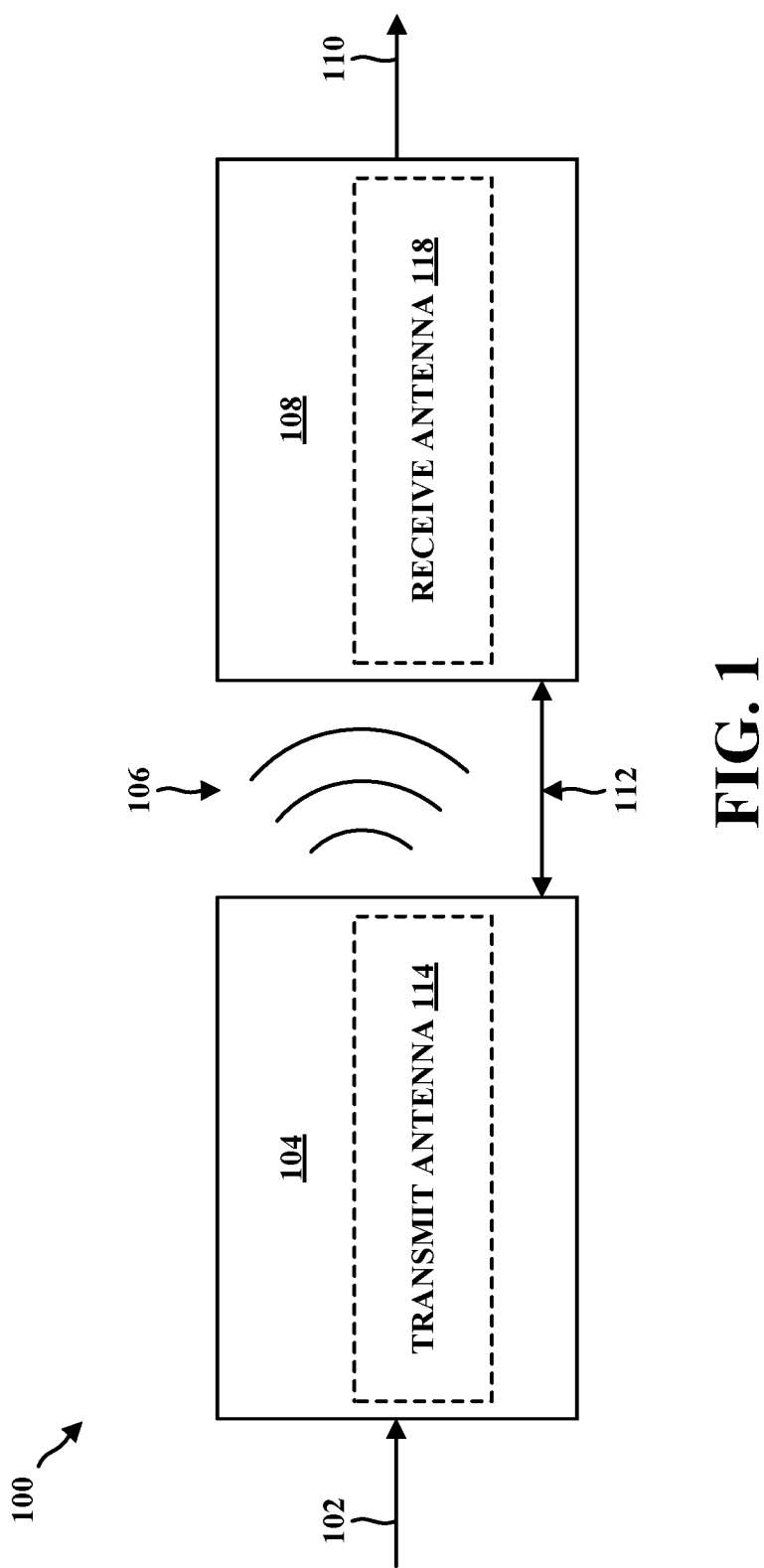
FIG. 1 is a block diagram of a wireless communication system in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structure.

FIG. 1 illustrates an NFC system 100 in accordance with various aspects of the present invention. Input power 102 is provided to a initiator 104 for generating a radiated field 106 that provides energy transfer. A target 108 may couple to the radiated field 106 and generate an output power 110 that may be stored or used to power a device (not shown) coupled to the output power 110. Both the initiator 104 and the target 108 are separated by a distance 112. In certain configurations, initiator 104 and target 108 may be configured according to a mutual resonant relationship and when the resonant frequency of target 108 and the resonant frequency of initiator 104 are very close, transmission losses between the initiator 104 and the target 108 may be reduced when the target 108 is located in the "near-field" of the radiated field 106.

The initiator 104 may include a transmit antenna 114 for providing energy transmission. The target 108 may include a receive antenna 118 that provides energy reception. The transmit and receive antennas 114, 118 may be sized according to applications and devices associated therewith. An efficient energy transfer may be provided by coupling a large portion of the energy in the near-field of the transmit 114 antenna to the receive antenna 118 rather than propagating most of the energy in an electromagnetic wave to the "far-field" (e.g., a distance that is greater than distance 112). During NFC, a coupling mode may be developed between the transmit antenna 114 and the receive antenna 118. The area around the antennas 114 and 118 where the near-field coupling may occur is referred to herein as a coupling-mode region.

Figure 2:
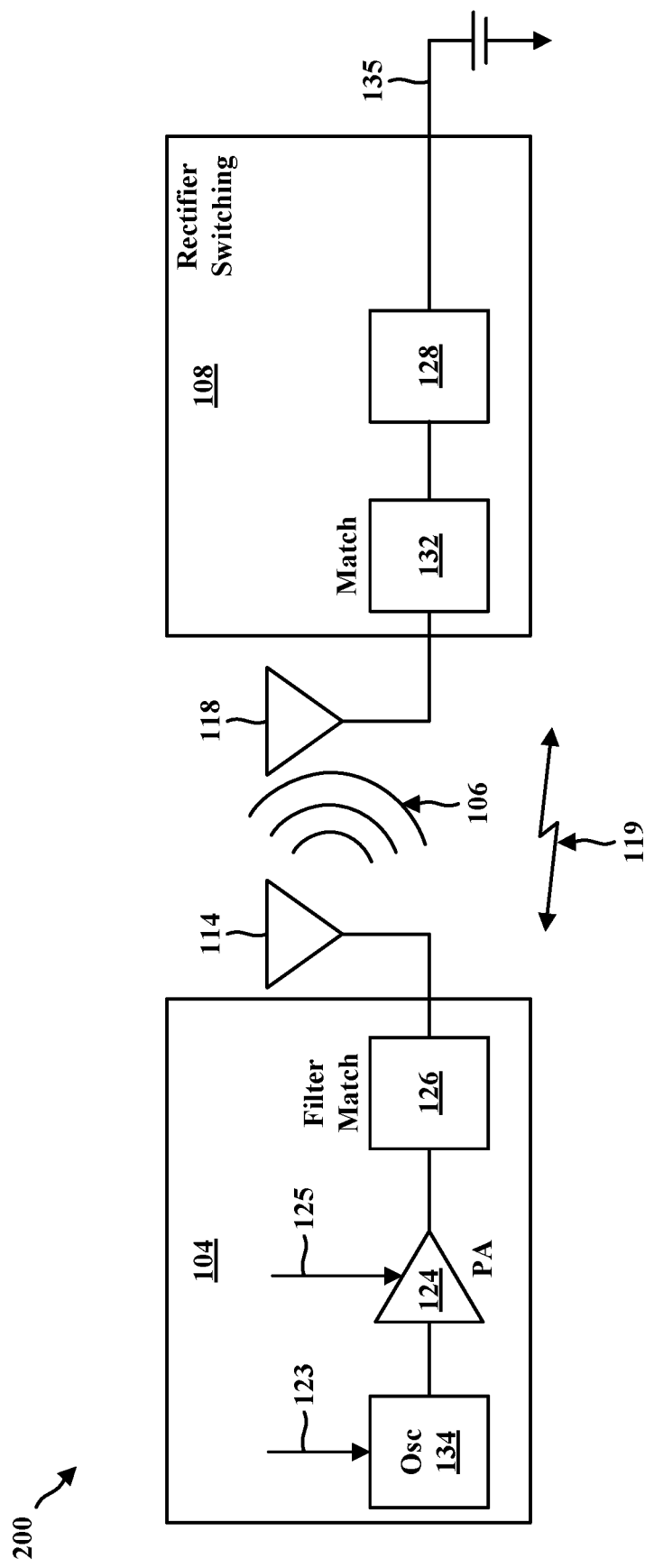
FIG. 2 is a schematic diagram of a wireless communication system in accordance with certain aspects of the disclosure.

FIG. 2 is a schematic diagram 200 of an example NFC system. The initiator 104 includes an oscillator 134, a power amplifier 124 and a filter and matching circuit 126. The oscillator 134 is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the initiator 104 to the transmit antenna 114.

The target 108 may include a matching circuit 132 and a rectifier and switching circuit 128 to generate a DC power output to charge a battery 135 or power a device coupled to the target 108 (not illustrated). The matching circuit 132 may be included to match the impedance of the target 108 to the receive antenna 118. The target 108 and initiator 104 may also communicate on a separate communication channel 119 (e.g., Bluetooth®, Zigbee®, cellular, etc.).

An NDEF message may include one or more NDEF records that each include a NDEF record header and an NDEF record payload. Examples of NDEF records may include text, URI, device information, verb, signature, and smart poster, just to name a few.

When NDEF messages are exchanged using peer-to-peer mode, the information in NDEF messages may be protected by encrypting information PDUs that contain the NDEF message(s) as long as the link between the devices was established in a secure mode. However, if the link between the initiator and target is initially set up as an unencrypted link there may not be a mechanism by which the link can be changed to an encrypted link without breaking the unencrypted link. Furthermore, there may not be a mechanism for establishing a secure link between a reader/writer and a card.

A target may protect information exchanged in an NDEF message by encrypting an adjacent higher layer. However, there may be use cases in which a shared secret needs to be derived between a reader/writer (e.g., target or initiator) and a card (e.g., initiator or target), e.g., as described below in connection with any of FIGS. 3A and 3B.

Figure 3A:
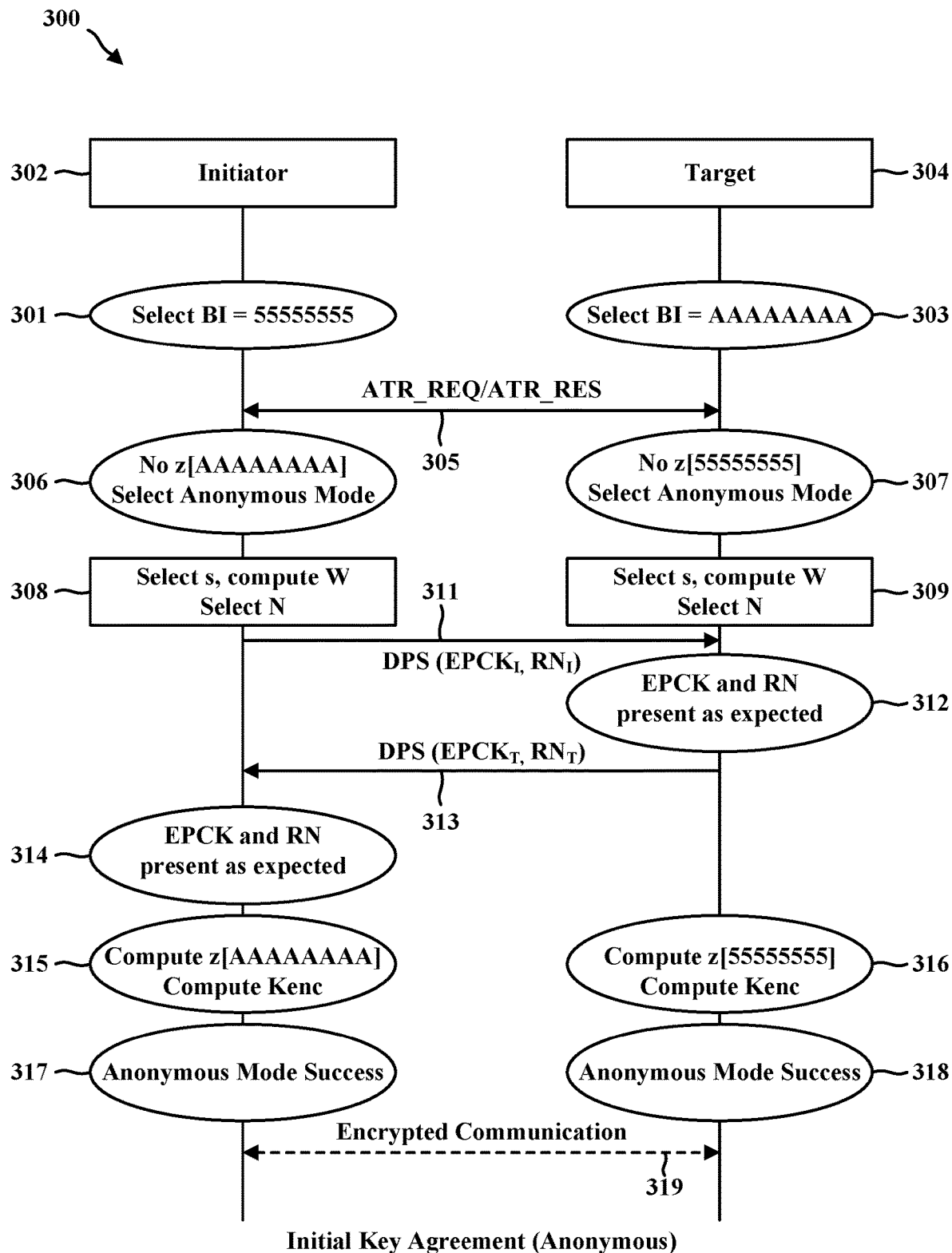
FIG. 3A is a data flow illustrating an anonymous key agreement procedure in accordance with certain aspects of the disclosure.

FIG. 3A is a data flow 300 illustrating an anonymous key agreement procedure in accordance with certain aspects of the disclosure.

As seen in FIG. 3A, an initiator 302 (e.g., initiator device) may determine and/or select (at 301) a first BI (e.g., first BI=55555555), and a target 304 (e.g., target device) may determine and/or select (at 303) a second BI (e.g., second BI=AAAAAAAA). The initiator 302 may transmit (at 305) an attribute request (ATR_REQ) PDU to the target 304. The ATR_REQ may include information associated with the first BI. The target 304 may respond by transmitting (at 305) an attribute response (ATR_RES) PDU to the initiator 302. The ATR_RES PDU may include information associated with the second BI.

The first BI and the second BI may be exchanged during a link activation process that is performed when the initiator 302 and/or the target 304 detect the presence of the other device (e.g., when the initiator 302 is placed within a predetermined distance from the target 304, or vice versa). In certain configurations, the first BI and the second BI may be used to convey a respective device identity under which a shared secret z can be associated or restored.

A BI may be chosen randomly when a device is used for the first time or after a factory reset. All values of shared secret z which are associated with a BI of a remote device may be destroyed whenever a new BI is chosen. The BI parameter value may be encoded as a sequence of eight octets representing the BI integer value with a particular conversion. A receiving device may apply the particular conversion to obtain the BI integer value received in the ATR_REQ PDU or the ATR_RES PDU.

The initiator 302 may determine (at 306) a shared secret (e.g., No z[AAAAAAAA]) based at least in part on the second BI. The target 304 may determine (at 307) the shared secret (e.g., No z[55555555]) based at least in part on the first BI.

Each of the initiator 302 and the target 304 may determine (at 308 and 309, respectively) a valid set of elliptic curve domain parameters as Curve P-256. Both the initiator 302 and the target 304 may determine a valid private key s (at 308 and 309, respectively), associated with the valid set of elliptic curve domain parameters. The valid private key s may be the output of a random or pseudo-random process. Each of the initiator 302 and the target 304 may determine a public key W=sG (at 308 and 309, respectively), with the sample base point G on Curve P-256. Each of the initiator 302 and the target 304 may determine (at 308 and 309, respectively) a random nonce N as 64 bits of output from a random or pseudo-random process.

The initiator 302 may transmit (at 311) a first PDU to the target 304. In certain configurations, the first PDU may be a data protection setup (DPS) PDU. The first PDU may include an elliptic curve public key (ECPK)$_I$ parameter that corresponds to the public key W and an random number (RN)$_I$ parameter that corresponds to the nonce N, respectively.

When the first DPS PDU does not contain a valid ECPK parameter that corresponds to the public key W determined (at 309) by the target 304 and/or a valid random number (RN) parameter that corresponds to the nonce N determined (at 309) by the target 304, the target 304 may terminate the key agreement procedure with an "abort" indication (not shown in FIG. 3A). When the first DPS PDU does not contain a valid EPCK parameter and/or a valid RN parameter, the target 304 may implement a bonding signal problem mechanism (not shown in FIG. 3A) and terminate the key agreement procedure with an "abort" indication (not shown in FIG. 3A). In certain configurations, the target 304 may implement the bonding signal problem mechanism by sending an empty DPS PDU (not shown in FIG. 3A) to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code. Receiving a first DPS PDU that does not include a valid EPCK parameter and/or valid RN parameter may indicate to the target 304 that a bonding problem has occurred, and that the initiator 302 is attempting anonymous key agreement, while the target 304 is expecting associated key agreement. Otherwise, when the first DPS PDU does contain a valid ECPK parameter and a valid RN parameter, the target 304 may determine (at 312) that the first DPS PDU contains a valid ECPK parameter and a valid RN parameter, and the target 304 may extract public key W' and nonce N' from the ECPK$_I$ and RN$_I$ parameter, respectively, and set N$_T$=N and N$_I$=N'.

The target 304 may send (at 313) a second DPS PDU that includes an ECPK$_T$ parameter that corresponds to the public key W and a RN$_T$ parameter that corresponds to the nonce N, respectively. If the second DPS PDU does not contain a valid ECPK parameter and a valid RN parameter, then the initiator 302 may terminate the key agreement procedure with an "abort" indication (not shown in FIG. 3A). Receiving a DPS PDU that does not contain a valid ECPK and a valid RN parameter may indicate to the initiator 302 that a bonding problem has occurred, and the target 304 may be attempting an associated key agreement. Otherwise, the initiator 302 may determine (at 314) that the second DPS PDU contains a valid ECPK parameter and a valid RN parameter, and the initiator 302 may extract the public key W' and nonce N' from the ECPK$_T$ and RN$_T$ parameter, respectively, and set N$_I$=N and N$_T$=N'.

When both the first DPS PDU and the second DPS PDU include a valid ECPK and a valid RN parameter, the initiator 302 and the target 304 may each determine an elliptic curve point P=sW', associated with the valid set of elliptic curve domain parameters.

If the initiator 302 and/or the target 304 determines that P=O (e.g., the elliptic point is at infinity), the initiator 302 and/or the target 304 may terminate the key agreement procedure with an "error" indication. The initiator 302 and the target 304 may determine (at 315 and 316, respectively) the shared secret value z (e.g., z[AAAAAAAA] and z[55555555] is equal to x$_P$, x$_P$ is the x-coordinate of P.

The initiator 302 and/or the target 304 may determine K=N$_I$||N$_T$, which may be a concatenation of the nonces exchanged in the first DPS PDU and the second DPS PDU. In certain configurations, K may be a 128-bit key.

The initiator 302 and the target 304 may determine (at 315 and 316, respectively) an encrypted key Kenc using an authentication algorithm AES-CMAC, K described above, and z, such that Kenc=AES-CMACK(z).

The initiator 302 and the target 304 may initialize a respective Send Packet Counter PC(S) and Receive Packet Counter PC(R) to zero. The initiator 302 and the target may destroy the private key s. If both the initiator and the target transmit the BI parameter and the OPT parameter with BM bit set to one, then the initiator and the target may maintain the shared secret value z for future associated key agreement with the other device by correlating the secret value z with the received BI parameter value of the other device. Otherwise, the initiator and/or the target may destroy the shared secret value z.

As seen in FIG. 3A, the anonymous key agreement is successful (at 317, 318), and encrypted communication may be performed (at 319) between the initiator 302 and the target 304. For example, the encrypted communication may include sending ones or more encrypted NDEF messages from the target 304 to the initiator 302, or vice versa.

Figure 3B:
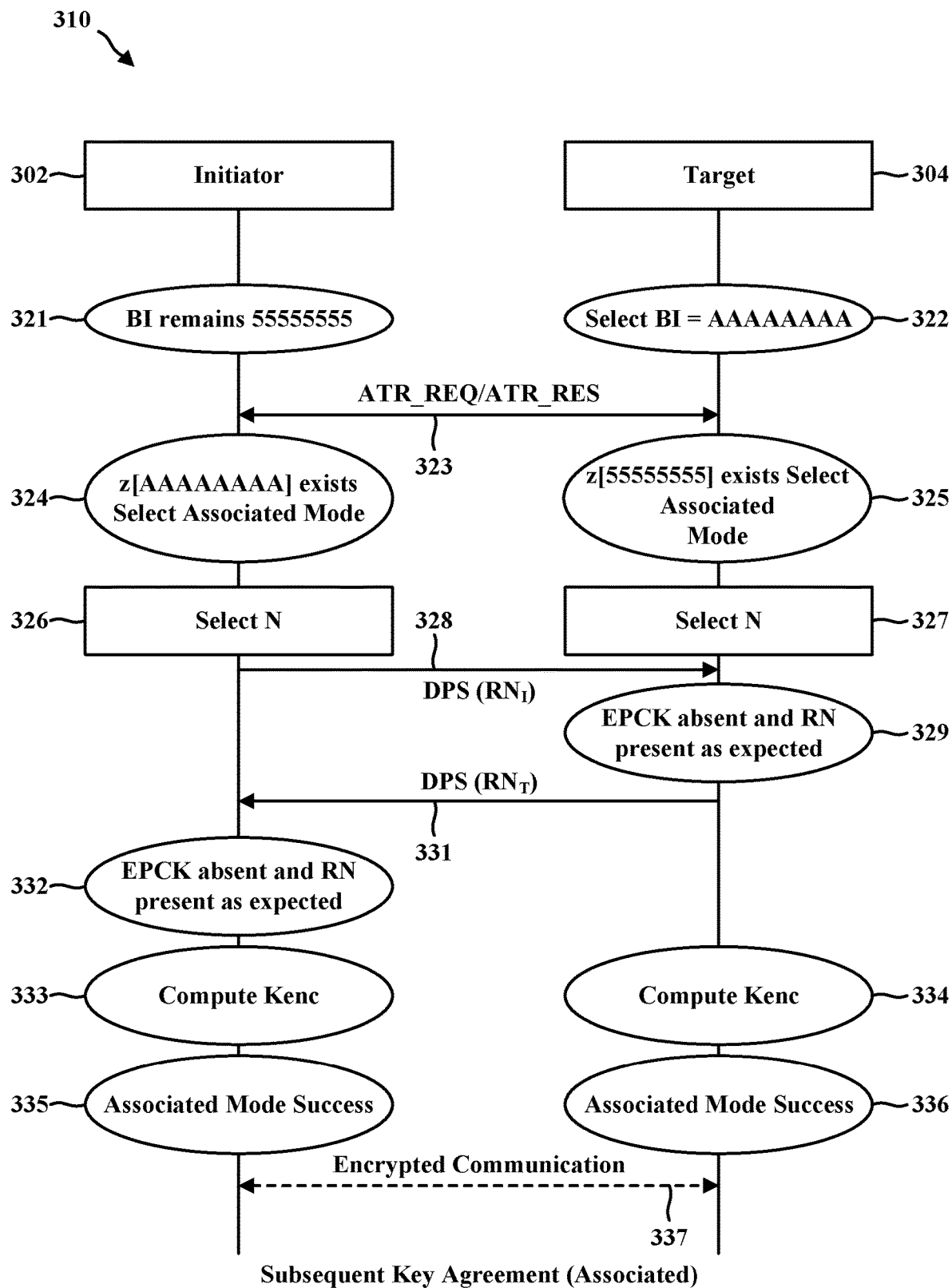
FIG. 3B is a data flow illustrating an associated key agreement procedure in accordance with certain aspects of the disclosure.

FIG. 3B is a data flow 310 illustrating an associated key agreement procedure in accordance with certain aspects of the disclosure.

As seen in FIG. 3B, the first BI associated with the initiator 302 remains (at 321) the same (e.g., first BI=55555555), and the second BI associated with the target 304 remains (at 322) the same (e.g., second BI=AAAAAAAA). The initiator 302 may transmit (at 323) a ATR_REQ that includes the first BI to the target 304. The target 304 may respond by transmitting (at 323) a ATR_RES that includes the second BI to the initiator 302.

The initiator 302 may determine (at 324) that a shared secret (e.g., z[AAAAAAA]) is associated with the second BI (e.g., indicating that an anonymous key agreement was previously performed). The target 304 may also determine (at 325) that the shared secret (e.g., z[5555555]) is associated with the first BI.

The initiator 302 may determine (at 326) a nonce N as 64 bits of output from a random or pseudo-random process. The target 304 may also determine (at 327) a nonce N as 64 bits of output from a random or pseudo-random process.

The initiator 302 may transmit (at 328) a first DPS PDU with nonce $N_I$ as the value of a $RN_I$ parameter and await receipt of a second DPS PDU transmitted (at 331) by the target 304. The target 304 may receive the first DPS PDU transmitted (at 328) by the initiator 302. If the received first DPS PDU does not contain a valid RN parameter, the target 304 may terminate the key agreement procedure with an "abort" indication. If the received first DPS PDU also contains a valid EPCK parameter, the target 304 may destroy the shared secret z[5555555] correlated with the first BI parameter value from the anonymous key agreement. The target 304 may implement a bonding problem signal mechanism (not shown in FIG. 3B), and terminate the key agreement procedure with an "abort" indication. In certain configurations, the target 304 may implement the bonding signal problem mechanism by sending an empty DPS PDU to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code.

Receiving the first DPS that contains both a valid RN and a valid EPCK parameter (not shown in FIG. 3B) may indicate that a bonding problem has occurred and the initiator is attempting anonymous key agreement. Otherwise, as illustrated in FIG. 3B, when the target 304 determines (at 329) that the first DPS PDU includes a valid RN and the EPCK is absent from the first DPS PDU as expected, the target 304 may extract nonce N' from the RN parameter and set $N_T=N$ and $N_I=N'$. The target 304 may transmit (at 331) the second DPS PDU with the nonce N as the value of a RN parameter.

If the second DPS PDU transmitted (at 331) by the target 304 does not include a valid RN parameter (not shown in FIG. 3B), the initiator 302 may remove and/or destroy the shared secret z[AAAAAAA] for the target 304 correlated with the second BI parameter value from the anonymous key agreement. The initiator 302 may terminate the associated key agreement procedure with an "abort" indication (not shown in FIG. 3B). Receiving a DPS PDU that does not include a valid RN parameter may indicate that a bonding problem has occurred and the target 304 is attempting anonymous key agreement (not shown in FIG. 3B). Otherwise, as illustrated in FIG. 3B, when the initiator 302 determines (at 332) that the second DPS PDU includes a valid RN and the EPCK is absent from the second DPS PDU as expected, the initiator 302 may extract nonce N' from the RN parameter and set $N_I=N$ and $N_T=N'$. In certain configurations, the initiator 302 and the target 304 may determine the shared secret associated with the first BI and/or the second BI that was maintained after the anonymous key agreement. The In certain other configurations, the initiator 302 and/or the target 304 may determine K=MINT, which may be a concatenation of the nonces $N_I$ and $N_T$ exchanged in the first DPS PDU and the second DPS PDU.

The initiator 302 and the target 304 may determine (at 333, 334) KENC=AES-CMACK(z) using an authentication algorithm (e.g., AES-CMAC), where K is a 128-bit key, message M=z, and the length of z in octets len=32.

In certain configurations, the initiator 302 and the target 304 may initialize a respective Send Packet Counter PC(S) and Receive Packet Counter PC(R) to zero.

As seen in FIG. 3B, the initiator 302 and the target 304 may determine (at 335, 336) that associated key agreement is successful, and encrypted communication may be performed (at 337) between the initiator 302 and the target 304. For example, the encrypted communication may include sending ones or more encrypted NDEF messages from the target 304 to the initiator 302, or vice versa.

There may be no mechanism that enables NFC devices take advantage of the shared secret to secure NDEF messages. The present disclosure provides a solution by enabling a target to encrypt an NDEF message and enabling the initiator to decrypt the NDEF message using the shared secret, e.g., as described below in connection with any of FIGS. 4-10.

Figure 4:
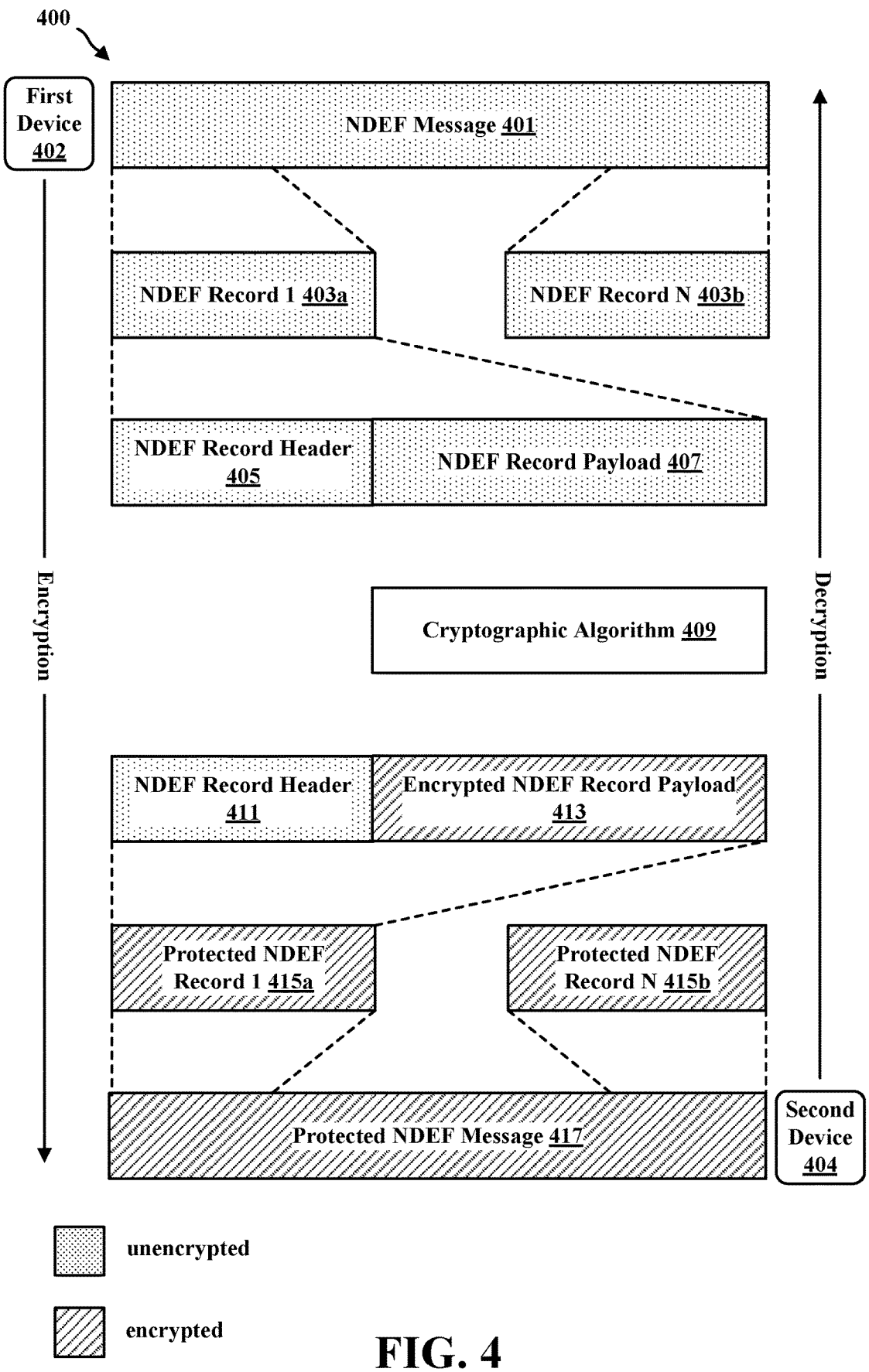
FIG. 4 illustrates a mechanism for NDEF message encryption and NDEF message decryption in accordance with certain aspects of the disclosure.

FIG. 4 illustrates an example mechanism 400 that may be used by a first device 402 to encrypt an NDEF message and a second device 404 to decrypt an NDEF message in accordance with certain aspects of the disclosure. The first device 402 may correspond to, e.g., the initiator 104, 302, the target 108, 304, the second device 950, the apparatus 602/602'. The second device 404 may correspond to, e.g., the initiator 104, 302, the target 108, 304, the second device 650, the apparatus 902/902'. In certain implementations, the example mechanism 400 may be performed using public key cryptography or symmetric key cryptography upon generating an encryption key such as a shared secret, a public key, and/or a symmetric key, e.g., using the technique(s) described above in connection with any of FIGS. 3A and 3B. However, the present disclosure is not limited to public key cryptography or symmetric key cryptography, and any suitable cryptographic algorithm may be used.

Referring to FIG. 4, the first device 402 may receive a request for an NDEF message from the second device 404, and may generate an unencrypted NDEF message 401 based on the request. In certain aspects, the unencrypted NDEF message 401 may include one of more NDEF records 403a, 403b that each include an NDEF record header 405 and an unencrypted NDEF record payload 407.

Prior to transmission, the first device 402 may encrypt the unencrypted NDEF message 401 by applying a cryptographic algorithm 409 (e.g., an encryption key such as the shared secret, the public key, and/or the symmetric key determined using the technique(s) described above in connection with any of FIGS. 3A and 3B) to generate an encrypted NDEF message 417. The first device 402 may encrypt the NDEF message 401 using any suitable cryptographic algorithm, such as public key cryptography, symmetric key cryptography, or another cryptographic algorithm.

For example, the first device 402 may extract the unencrypted NDEF record payload 407 (e.g., the plain text payload) from each of the one or more NDEF records 403a, 403b. Upon extraction, the first device 402 may encrypt the unencrypted NDEF record payload 407 from each of the one or more NDEF records 403a, 403b based at least in part on the at least one encryption key to generate an encrypted NDEF record payload 413 for each of the one or more security protected NDEF records 415a, 415b (e.g., encrypted NDEF records). The first device 402 may append the encrypted NDEF record payload 413 to an associated NDEF record header 411 for each of the one or more NDEF records 415*a*, 415*b*. The first device 402 may assemble the one or more NDEF records 415*a*, 415*b* that each include the encrypted NDEF record payload 413 appended to the associated NDEF record header 411 to generate an encrypted NDEF message 417. Upon encryption, the first device 402 may transmit the encrypted NDEF message 417 to the second device 404, e.g., using short-range communication such as NFC.

Upon receipt of the encrypted NDEF message 417, the second device 404 may decrypt the encrypted NDEF message 417 to extract the unencrypted NDEF message 401 requested by the second device 404. In certain aspects, the second device 404 may apply the cryptographic algorithm 409 to obtain the unencrypted NDEF message 401.

For example, the second device 404 may extract the encrypted NDEF record payload 413 from each of the one or more security protected NDEF records 415*a*, 415*b*, and decrypt the encrypted NDEF record payload 413 from each of the one or more NDEF records 415*a*, 415*b* to obtain the unencrypted NDEF record payload 407 for each of the one or more NDEF records 403*a*, 403*b*. The second device 404 may append the unencrypted NDEF record payload 407 to an associated NDEF recorder header 405 for each of the one or more NDEF records 403*a*, 403*b*, and assemble the one or more NDEF records 403*a*, 403*b* to obtain the unencrypted NDEF message 401.

Using the technique(s) described above in connection with FIG. 4, NFC devices of the present disclosure may take advantage of the shared secret or other encryption key(s) to secure NDEF messages communicated between an initiator and a target.

Figure 5A:
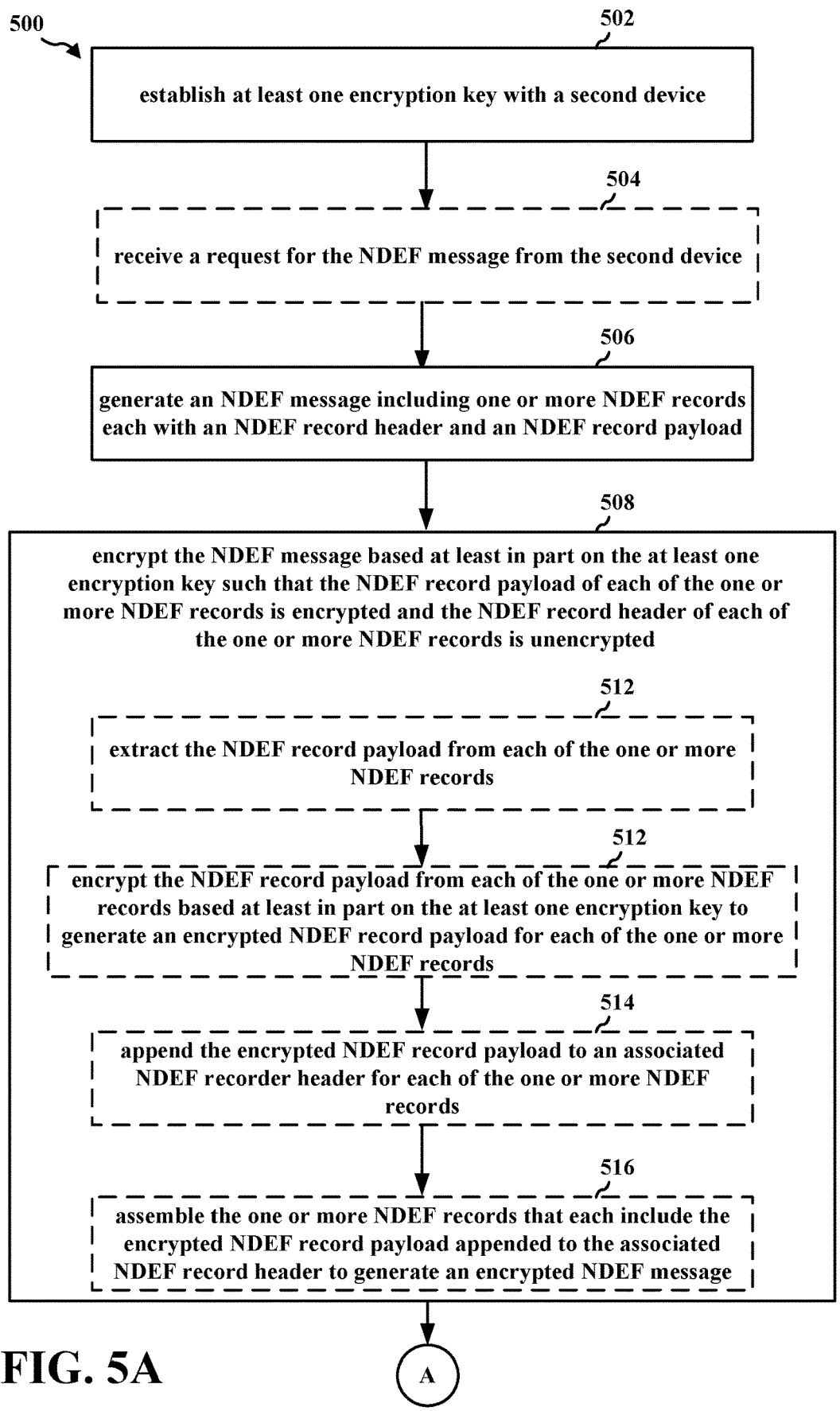
FIGS. 5A and 5B illustrate a flowchart of a method of wireless communication.
Figure 5B:
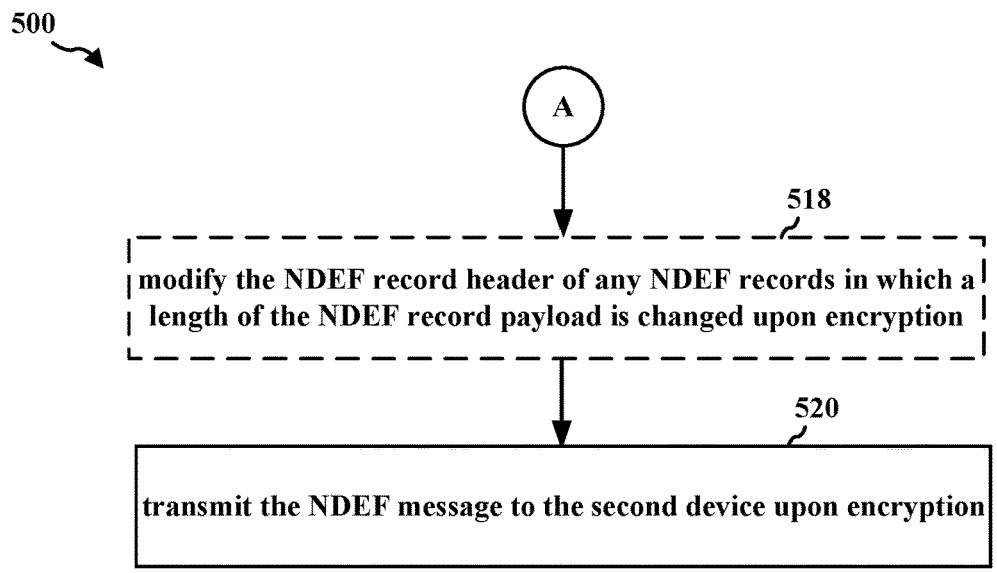

FIGS. 5A and 5B are a flowchart 500 of a method of wireless communication. The method may be performed by a first device (e.g., the initiator 104, 302, the target 108, 304, the first device 402, the second device 950, the apparatus 602/602'). In FIGS. 5A and 5B, optional operations are indicated with dashed links.

Referring to FIG. 5A, at 502, the first device may establish at least one encryption key with a second device. In certain aspects, the at least one encryption key may include one or more of a shared secret, a public key, or a symmetric key. The encryption key may be used for, e.g., public key cryptography, symmetric key cryptography, and/or another cryptographic algorithm. Example mechanism(s) for establishing at least one encryption key are discussed supra in connection with FIGS. 3A and 3B.

At 504, the first device may receive a request for the NDEF message from the second device. For example, referring to FIG. 4, the first device 402 may receive a request for an NDEF message from the second device 404.

At 506, the first device may generate an NDEF message. In certain aspects, the NDEF message may include one or more NDEF records. In certain other aspects, each of the one or more NDEF records may include an NDEF record header and an NDEF record payload. In certain aspects, the NDEF message may be generated upon receipt of the request. For example, referring to FIG. 4, the first device 402 may generate an unencrypted NDEF message 401 based on the request. In certain aspects, the unencrypted NDEF message 401 may include one of more NDEF records 403*a*, 403*b* that each include an NDEF record header 405 and an unencrypted NDEF record payload 407.

At 508, the first device may encrypt the NDEF message based at least in part on the at least one encryption key such that the NDEF record payload of each of the one or more NDEF records is encrypted and the NDEF record header of each of the one or more NDEF records is unencrypted. For example, referring to FIG. 4, the first device 402 may encrypt the unencrypted NDEF message 401 by applying a cryptographic algorithm 409 (e.g., an encryption key such as the shared secret, the public key, and/or the symmetric key determined using the technique(s) described above in connection with any of FIGS. 3A and 3B) to generate an encrypted NDEF message 417.

At 510, the first device may encrypt the NDEF message based at least in part on the at least one encryption key by extracting the NDEF record payload from each of the one or more NDEF records. For example, referring to FIG. 4, the first device 402 may extract the unencrypted NDEF record payload 407 (e.g., the plain text payload) from each of the one or more NDEF records 403*a*, 403*b*.

At 512, the first device may encrypt the NDEF message based at least in part on the at least one encryption key by encrypting the NDEF record payload from each of the one or more NDEF records based at least in part on the at least one encryption key to generate an encrypted NDEF record payload for each of the one or more NDEF records. In certain aspects, the encrypting the NDEF record payload may be performed using one or more of public key cryptography or symmetric key cryptography. For example, referring to FIG. 4, the first device 402 may encrypt the unencrypted NDEF record payload 407 from each of the one or more NDEF records 403*a*, 403*b* based at least in part on the at least one encryption key to generate an encrypted NDEF record payload 413 for each of the one or more security protected NDEF records 415*a*, 415*b*.

At 514, the first device may encrypt the NDEF message based at least in part on the at least one encryption key by appending the encrypted NDEF record payload to an associated NDEF recorder header for each of the one or more NDEF records. For example, referring to FIG. 4, the first device 402 may append the encrypted NDEF record payload 413 to an associated NDEF record header 411 for each of the one or more NDEF records 415*a*, 415*b*.

At 516, the first device may encrypt the NDEF message based at least in part on the at least one encryption key by assembling the one or more NDEF records that each include the encrypted NDEF record payload appended to the associated NDEF record header to generate an encrypted NDEF message. For example, referring to FIG. 4, the first device 402 may assemble the one or more NDEF records 415*a*, 415*b* that each include the encrypted NDEF record payload 413 appended to the associated NDEF record header 411 to generate an encrypted NDEF message 417.

Referring to FIG. 5B, at 518, the first device may modify the NDEF record header of any NDEF records in which a length of the NDEF record payload is changed upon encryption. For example, referring to FIG. 4, the first device 402 may modify the NDEF record header 411 of any NDEF records in which a length of the NDEF record payload is changed upon encryption.

At 520, the first device may transmit the NDEF message to the second device upon encryption. In certain aspects, the NDEF message may be transmitted to the second device via an NFC link. For example, referring to FIG. 4, the first device 402 may transmit the encrypted NDEF message 417 to the second device 404, e.g., using a short-range communication link such as an NFC link.

Figure 6:
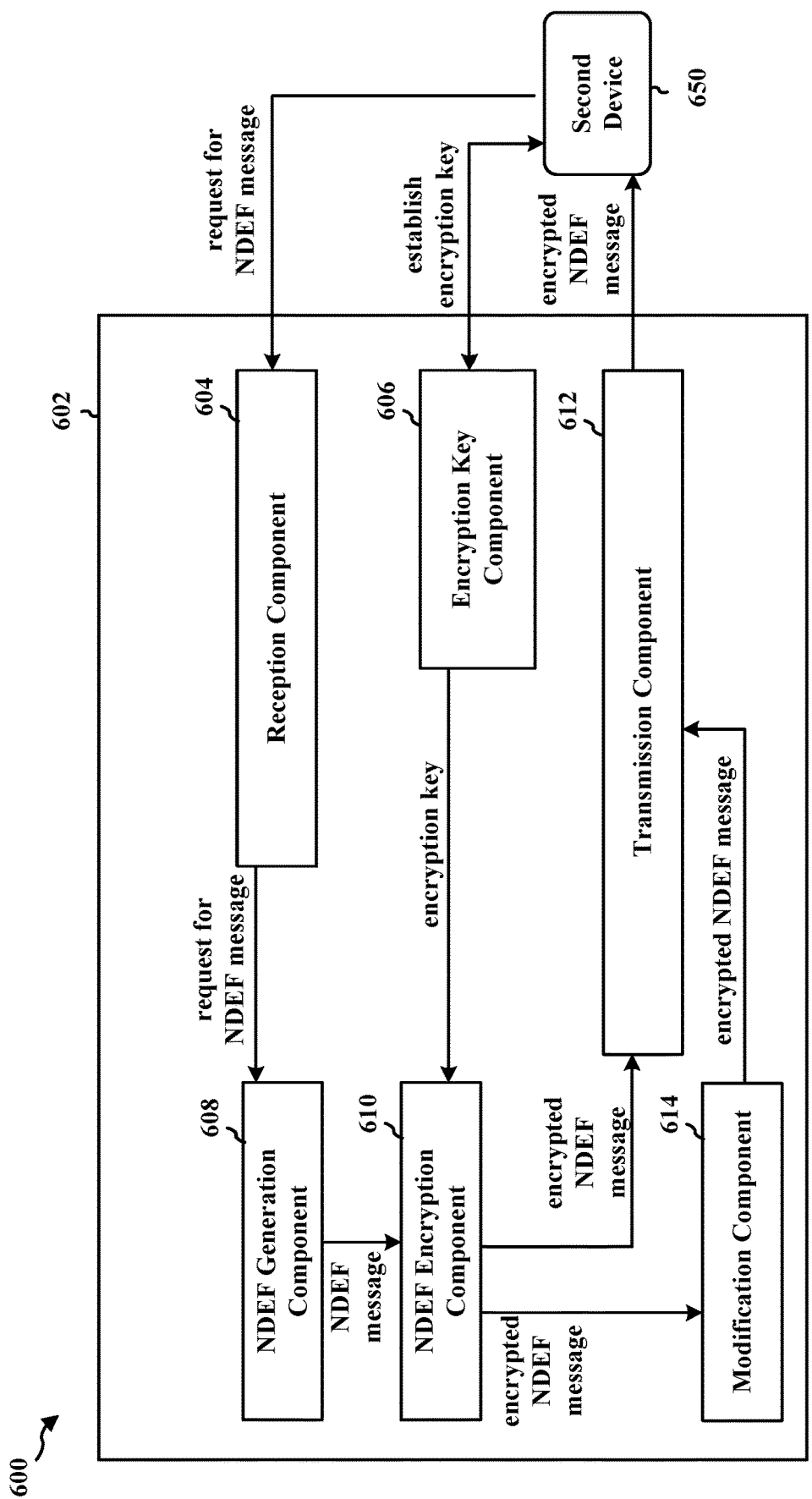
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a first device (e.g., the initiator 104, 302, the target 108, 304, the first device 402, the second device 950, the apparatus 602') in communication with a second device 650 (e.g., the initiator 104, 302, the target 108, 304, the second device 404, the apparatus 902/902'). The apparatus may include a reception component 604, an encryption key component 606, an NDEF generation component 608, and NDEF encryption component 610, a transmission component 612, and a modification component 614.

The encryption key component 606 may be configured to may establish at least one encryption key with a second device 650. In certain aspects, the at least one encryption key may include one or more of a shared secret, a public key, or a symmetric key. In certain aspects, the encryption key may be used for, e.g., public key cryptography, symmetric key cryptography, etc. The encryption key component 606 may be configured to send a signal indicating the encryption key to the NDEF encryption component 610.

The reception component 604 may be configured to receive a request for the NDEF message from the second device 650. The reception component 604 may be configured to send the request to the NDEF generation component 608.

The NDEF generation component 608 may be configured to generate an NDEF message. In certain aspects, the NDEF message may include one or more NDEF records. In certain other aspects, each of the one or more NDEF records may include an NDEF record header and an NDEF record payload. In certain aspects, the NDEF message may be generated upon receipt of the request. The NDEF generation component 608 may be configured to send the NDEF message to the NDEF encryption component 610.

The NDEF encryption component 610 may be configured to encrypt the NDEF message based at least in part on the at least one encryption key such that the NDEF record payload of each of the one or more NDEF records is encrypted and the NDEF record header of each of the one or more NDEF records is unencrypted. In certain implementations, the NDEF encrypting component 610 may be configured to encrypt the NDEF message using one or more of public key cryptography or symmetric key cryptography. In certain configurations, the NDEF encryption component 610 may be configured to encrypt the NDEF message based at least in part on the at least one encryption key by extracting the NDEF record payload from each of the one or more NDEF records. In certain other configurations, the NDEF encryption component 610 may be configured to encrypt the NDEF message based at least in part on the at least one encryption key by encrypting the NDEF record payload from each of the one or more NDEF records based at least in part on the at least one encryption key to generate an encrypted NDEF record payload for each of the one or more NDEF records. In certain other configurations, the NDEF encryption component 610 may be configured to encrypt the NDEF message based at least in part on the at least one encryption key by appending the encrypted NDEF record payload to an associated NDEF recorder header for each of the one or more NDEF records. In certain other configurations, the NDEF encryption component 610 may be configured to encrypt the NDEF message based at least in part on the at least one encryption key by assembling the one or more NDEF records that each include the encrypted NDEF record payload appended to the associated NDEF record header to generate an encrypted NDEF message. When the length of one or more NDEF record payloads are changed during encryption, the NDEF encryption component 610 may be configured to send the encrypted NDEF message to the modification component 614. Otherwise, when a length of all NDEF record payloads remain unchanged once encrypted, the NDEF encryption component 610 may be configured to send the encrypted NDEF message to the transmission component 612.

The modification component 614 may be configured to modify the NDEF record header of any NDEF records in which a length of the NDEF record payload is changed upon encryption. The modification component 614 may be configured to send the encrypted NDEF message with the modified NDEF record header(s) to the transmission component 612.

The transmission component 612 may be configured to transmit the NDEF message to the second device 650 upon encryption. In certain aspects, the NDEF message may be transmitted to the second device via an NFC link.

The apparatus may include additional components that perform each of the blocks of the algorithm in the aforementioned flowcharts of FIGS. 5A and 5B. As such, each block in the aforementioned flowcharts of FIGS. 5A and 5B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
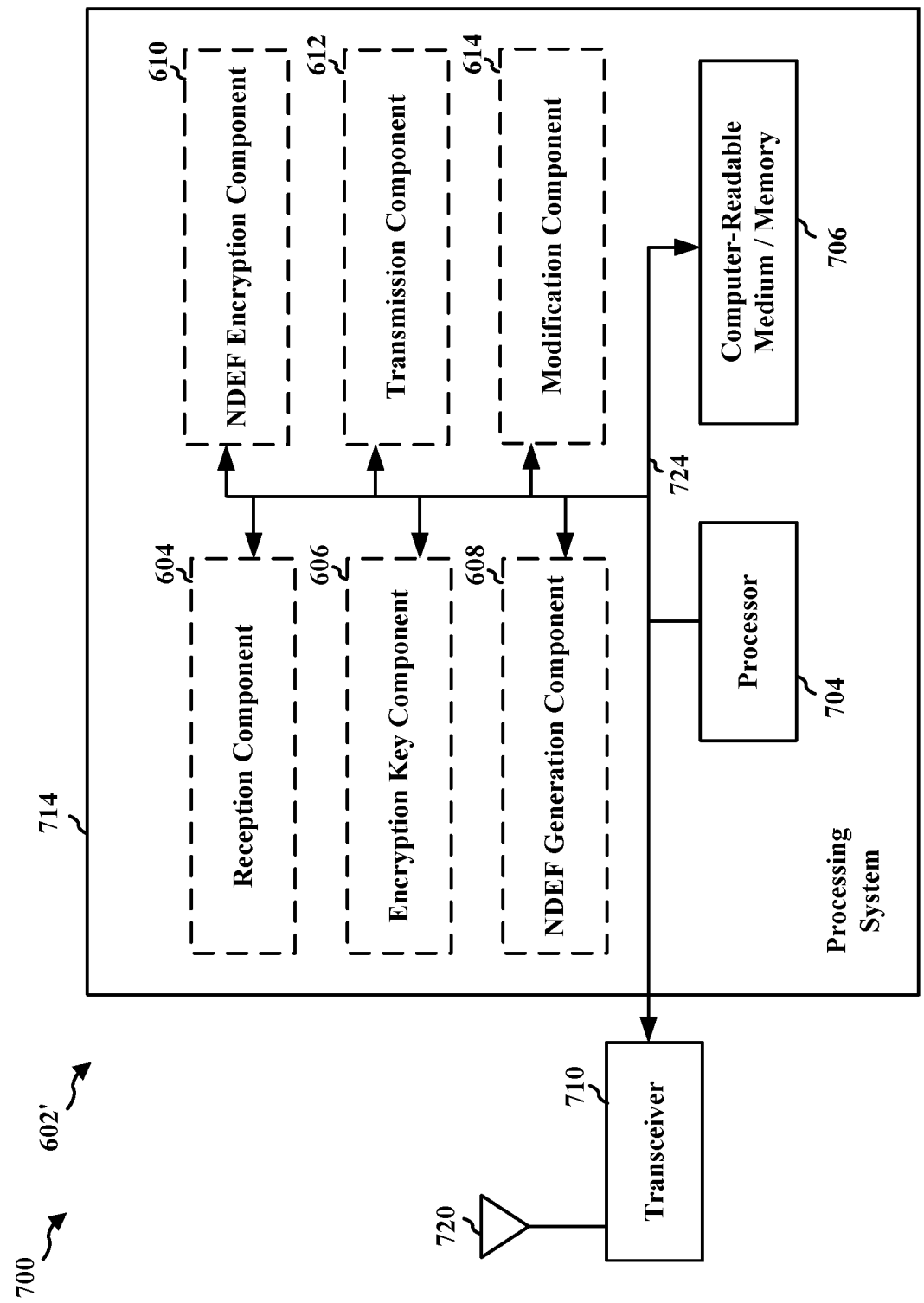
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 612, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614. The components may be software components running in the processor 704, resident/stored in the computer readable medium/memory 706, one or more hardware components coupled to the processor 704, or some combination thereof.

In certain configurations, the apparatus 602/602' for wireless communication may include means for establishing at least one encryption key with a second device. In certain aspects, the at least one encryption key may include one or more of a shared secret, a public key, or a symmetric key. The encryption key may be used to, e.g., public key cryptography, symmetric key cryptography, etc. In certain other configurations, the apparatus 602/602' for wireless communication may include means for receiving a request for the NDEF message from the second device. In certain other configurations, the apparatus 602/602' for wireless communication may include means for generating an NDEF message. In certain aspects, the NDEF message may include one or more NDEF records. In certain other aspects, each of the one or more NDEF records may include an NDEF record header and an NDEF record payload. In certain aspects, the NDEF message may be generated upon receipt of the request. In certain other configurations, the apparatus 602/602' for wireless communication may include means for encrypting the NDEF message based at least in part on the at least one encryption key such that the NDEF record payload of each of the one or more NDEF records is encrypted and the NDEF record header of each of the one or more NDEF records is unencrypted. In certain aspects, the at least one encryption key is associated with at least one of public key cryptography or symmetric key cryptography. In certain aspects, the means for encrypting the NDEF message based at least in part on the at least one encryption key may be configured to extract the NDEF record payload from each of the one or more NDEF records. In certain other aspects, the means for encrypting the NDEF message based at least in part on the at least one encryption key may be configured to encrypt the NDEF record payload from each of the one or more NDEF records based at least in part on the at least one encryption key to generate an encrypted NDEF record payload for each of the one or more NDEF records. In certain other aspects, the means for encrypting the NDEF message based at least in part on the at least one encryption key may be configured to append the encrypted NDEF record payload to an associated NDEF recorder header for each of the one or more NDEF records. In certain other aspects, the means for encrypting the NDEF message based at least in part on the at least one encryption key may be configured to assemble the one or more NDEF records that each include the encrypted NDEF record payload appended to the associated NDEF record header to generate an encrypted NDEF message. In certain other configurations, the apparatus 602/602' for wireless communication may include means for modifying the NDEF record header of any NDEF records in which a length of the NDEF record payload is changed upon encryption. In certain other configurations, the apparatus 602/602' for wireless communication may include means for transmitting the NDEF message to the second device upon encryption. In certain aspects, the NDEF message may be transmitted to the second device via an NFC link. The aforementioned means may be one or more of the aforementioned components of the apparatus 602 and/or the processing system 714 of the apparatus 602' configured to perform the functions recited by the aforementioned means.

Figure 8:
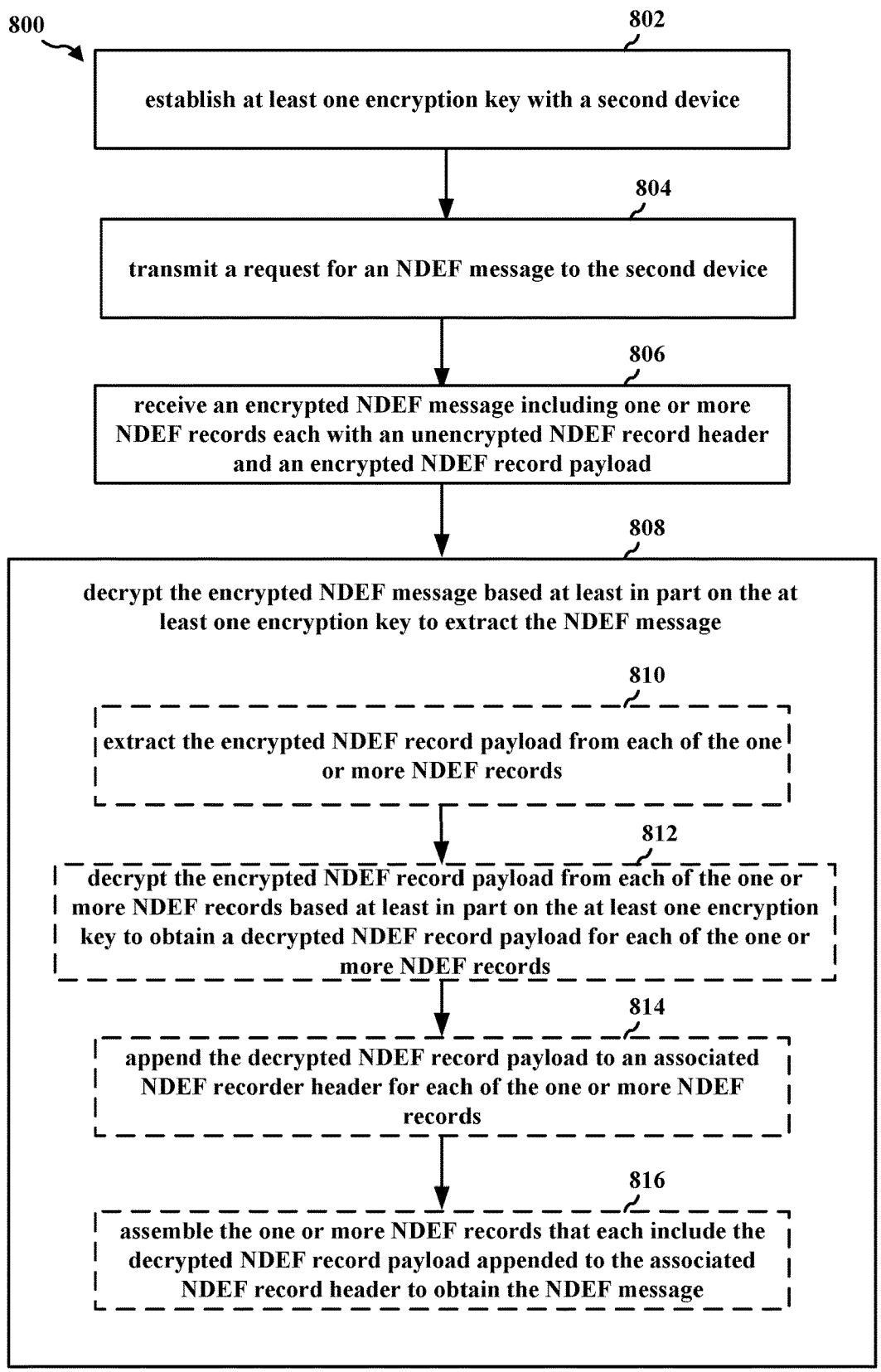
FIG. 8 illustrate a flowchart of a method of wireless communication.

FIG. 8 are a flowchart 800 of a method of wireless communication. The method may be performed by a first device (e.g., the initiator 104, 302, the target 108, 304, the second device 404, 650, the apparatus 902/902'). In FIG. 8, optional operations are indicated with dashed links.

At 802, the first device may establish at least one encryption key with a second device. In certain aspects, the at least one encryption key may include one or more of a shared secret, a public key, or a symmetric key. For example, referring to FIG. 4, the at least one encryption key may include one or more of a shared secret, a public key, or a symmetric key. Example mechanism(s) for establishing at least one encryption key are discussed supra in connection with FIGS. 3A and 3B.

At 804, the first device may transmit a request for an NDEF message to the second device. For example, referring to FIG. 4, the second device 404 may transmit a request for an NDEF message to the first device 402.

At 806, the first device may receive an encrypted NDEF message from the second device. In certain aspects, the NDEF message may be encrypted using, e.g., one or more of public key cryptography or symmetric key cryptography. In certain aspects, the encrypted NDEF message may include one or more NDEF records. In certain other aspects, each of the one or more NDEF records may include an unencrypted NDEF record header and an encrypted NDEF record payload. In certain other aspects, the NDEF message may be received from the second device via an NFC link. For example, referring to FIG. 4, the second device 404 may receive an encrypted NDEF message 417 from the first device 402, e.g., using short-range communication such as NFC.

At 808, the first device may decrypt the encrypted NDEF message based at least in part on the at least one encryption key to extract the NDEF message. For example, referring to FIG. 4, the second device 404 may decrypt the encrypted NDEF message 417 to extract the unencrypted NDEF message 401 requested by the second device 404. In certain aspects, the second device 404 may apply the cryptographic algorithm 409 to obtain the unencrypted NDEF message 401.

At 810, the first device may decrypt the encrypted NDEF message to extract the NDEF message by extracting the encrypted NDEF record payload from each of the one or more NDEF records. For example, referring to FIG. 4, the second device 404 may extract the encrypted NDEF record payload 413 from each of the one or more security protected NDEF records 415a, 415b.

At 812, the first device may decrypt the encrypted NDEF message to extract the NDEF message by decrypting the encrypted NDEF record payload from each of the one or more NDEF records based at least in part on the at least one encryption key to obtain a decrypted NDEF record payload for each of the one or more NDEF records. For example, referring to FIG. 4, the second device 404 may decrypt the encrypted NDEF record payload 413 from each of the one or more NDEF records 415a, 415b to obtain the unencrypted NDEF record payload 407 for each of the one or more NDEF records 403a, 403b.

At 814, the first device may decrypt the encrypted NDEF message to extract the NDEF message by appending the decrypted NDEF record payload to an associated NDEF recorder header for each of the one or more NDEF records. For example, referring to FIG. 4, the second device 404 may append the unencrypted NDEF record payload 407 to an associated NDEF recorder header 405 for each of the one or more NDEF records 403a, 403b.

At 816, the first device may decrypt the encrypted NDEF message to extract the NDEF message by assembling the one or more NDEF records that each include the decrypted NDEF record payload appended to the associated NDEF record header to obtain the NDEF message. For example, referring to FIG. 4, the second device 404 may assemble the one or more NDEF records 403a, 403b to obtain the unencrypted NDEF message 401.

Figure 9:
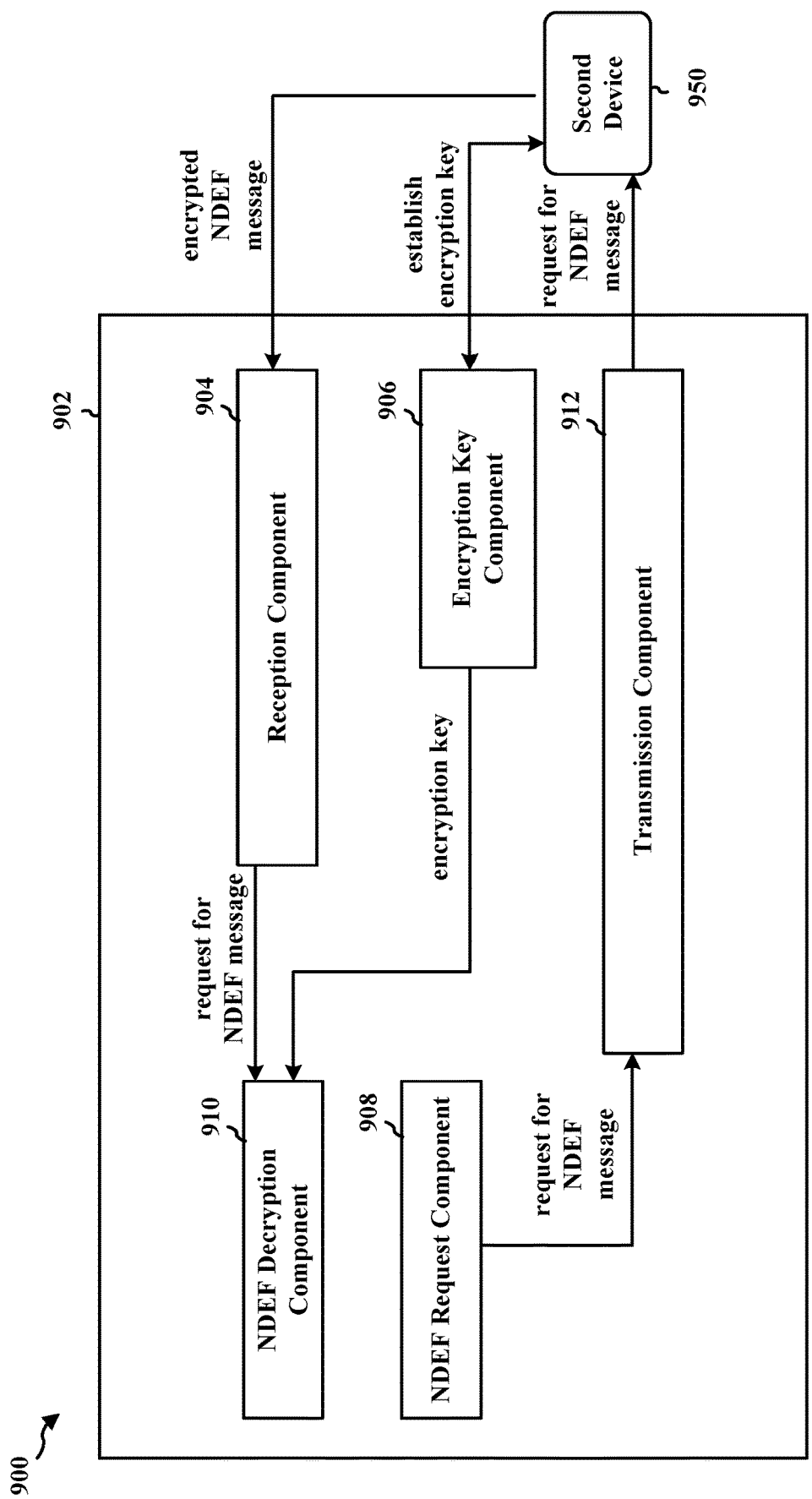
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a first device (e.g., the initiator 104, 302, the target 108, 304, the second device 404, 650, the apparatus 902') in communication with a second device 950 (e.g., the initiator 104, 302, the target 108, 304, the first device 402, the apparatus 602/602'). The apparatus may include a reception component 904, an encryption key component 906, an NDEF request component 908, an NDEF decryption component 910, and a transmission component 912.

The encryption key component 906 may be configured to establish at least one encryption key with the second device 950. In certain aspects, the at least one encryption key may include one or more of a shared secret, a public key, or a symmetric key. The encryption key component 906 may be configured to send a signal indicating the encryption key to the NDEF decryption component 910.

The NDEF request component 908 may be configured to generate an NDEF request that is sent to the transmission component 912.

The transmission component 912 may be configured to transmit a request for an NDEF message to the second device 950.

The reception component 904 may be configured to receive an encrypted NDEF message from the second device. In certain aspects, the NDEF message may be encrypted using, e.g., one or more of public key cryptography or symmetric key cryptography. In certain aspects, the encrypted NDEF message may include one or more NDEF records. In certain other aspects, each of the one or more NDEF records may include an unencrypted NDEF record header and an encrypted NDEF record payload. In certain other aspects, the NDEF message may be received from the second device via an NFC link. The reception component 904 may be configured to send the encrypted NDEF message to the NDEF decryption component 910.

The NDEF decryption component 910 may be configured to decrypting the encrypted NDEF message to extract the NDEF message. In certain aspects, the encrypted NDEF message may be decrypted based at least in part on the encryption key. In certain aspects, the NDEF decryption component 910 may be configured to decrypt the encrypted NDEF message to extract the NDEF message by extracting the encrypted NDEF record payload from each of the one or more NDEF records. In certain other aspects, the NDEF decryption component 910 may be configured to decrypt the encrypted NDEF message to extract the NDEF message by decrypting the encrypted NDEF record payload from each of the one or more NDEF records based at least in part on the at least one encryption key to obtain a decrypted NDEF record payload for each of the one or more NDEF records. In certain other aspects, the NDEF decryption component 910 may be configured to decrypt the encrypted NDEF message to extract the NDEF message by appending the decrypted NDEF record payload to an associated NDEF recorder header for each of the one or more NDEF records. In certain other aspects, the NDEF decryption component 910 may be configured to decrypt the encrypted NDEF message to extract the NDEF message by assembling the one or more NDEF records that each include the decrypted NDEF record payload appended to the associated NDEF record header to obtain the NDEF message.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
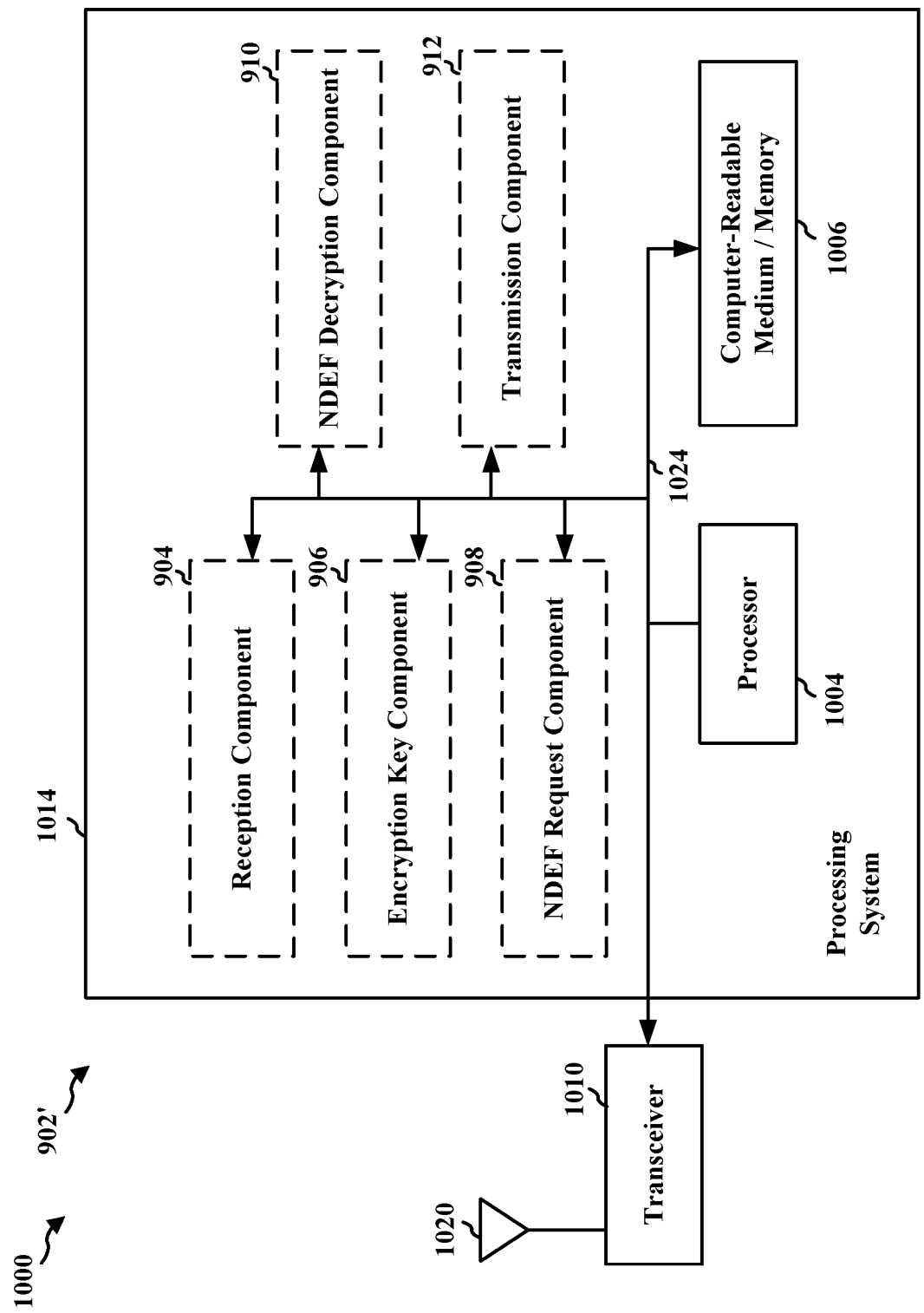
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof.

In certain configurations, the apparatus 902/902' for wireless communication may include means for establishing at least one encryption key with a second device. In certain aspects, the at least one encryption key may include one or more of a shared secret, a public key, or a symmetric key. In certain other configurations, the apparatus 902/902' for wireless communication may include means for transmitting a request for an NDEF message to the second device. In certain other configurations, the apparatus 902/902' for wireless communication may include means for receiving an encrypted NDEF message from the second device. In certain aspects, the encrypted NDEF message may include one or more NDEF records. In certain aspects, the NDEF message may be encrypted using, e.g., one or more of public key cryptography or symmetric key cryptography. In certain other aspects, each of the one or more NDEF records may include an unencrypted NDEF record header and an encrypted NDEF record payload. In certain other aspects, the NDEF message may be received from the second device via an NFC link. In certain other configurations, the apparatus 902/902' for wireless communication may include means for decrypting the encrypted NDEF message based at least in part on the at least one encryption key to extract the NDEF message. In certain aspects, the means for decrypting the encrypted NDEF message to extract the NDEF message may be configured to extract the encrypted NDEF record payload from each of the one or more NDEF records. In certain other aspects, the means for decrypting the encrypted NDEF message to extract the NDEF message may be configured to decrypt the encrypted NDEF record payload from each of the one or more NDEF records based at least in part on the at least one encryption key to obtain a decrypted NDEF record payload for each of the one or more NDEF records. In certain other aspects, the means for decrypting the encrypted NDEF message to extract the NDEF message may be configured to append the decrypted NDEF record payload to an associated NDEF recorder header for each of the one or more NDEF records. In certain other aspects, the means for decrypting the encrypted NDEF message to extract the NDEF message may be configured to assemble the one or more NDEF records that each include the decrypted NDEF record payload appended to the associated NDEF record header to obtain the NDEF message. The aforementioned means may be one or more of the aforementioned components of the apparatus 902 and/or the processing system 1014 of the apparatus 902' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first device, comprising:
    establishing at least one encryption key with a second device;
    determining one or more unencrypted Near Field Communication (NFC) Forum Data Exchange Format (NDEF) records in an unencrypted NDEF message;
    for each of the one or more unencrypted NDEF records:
        extracting an unencrypted NDEF record payload from a corresponding unencrypted NDEF record;
        encrypting the unencrypted NDEF record payload into an encrypted NDEF record payload based at least in part on the at least one encryption key; and
        generating an encrypted NDEF record comprising the encrypted NDEF record payload and an unencrypted NDEF record header of the corresponding unencrypted NDEF record;
    modifying an unencrypted NDEF record header of at least one encrypted NDEF record of the one or more encrypted NDEF records when a length of an unencrypted NDEF record payload of the at least one encrypted NDEF record is different than a length of a corresponding encrypted NDEF record payload;
    generating an encrypted NDEF message comprising one or more encrypted NDEF records; and
    transmitting the encrypted NDEF message to the second device.

2. The method of claim 1, wherein the at least one encryption key is associated with at least one of public key cryptography or symmetric key cryptography.

3. The method of claim 1, wherein the encrypted NDEF message is transmitted to the second device via an NFC link.

4. The method of claim 1, further comprising:
    receiving a request for a NDEF message from the second device; and
    generating the unencrypted NDEF message upon receipt of the request.

5. The method of claim 1, wherein:
    the generating the encrypted NDEF record comprises:
        appending the encrypted NDEF record payload to the unencrypted NDEF recorder header for each of the one or more unencrypted NDEF records, and
    the generating the encrypted NDEF message comprises:
        assembling the one or more encrypted NDEF records that each includes the encrypted NDEF record payload appended to the unencrypted NDEF record header.

6. The method of claim 1, wherein the encrypted NDEF record payload of the at least one encrypted NDEF record is a result of encrypting the unencrypted NDEF record payload.

7. A method of wireless communication of a first device, comprising:
 establishing at least one encryption key with a second device in response to detecting presence of the second device;
 transmitting a request for a Near Field Communication (NFC) Forum Data Exchange Format (NDEF) message to the second device;
 receiving an encrypted NDEF message from the second device based on the request, the encrypted NDEF message-comprising one or more encrypted NDEF records;
 for each of the one or more encrypted NDEF records:
  extracting an encrypted NDEF record payload from a corresponding encrypted NDEF record;
  decrypting the encrypted NDEF record payload into a decrypted NDEF record payload based at least in part on the at least one encryption key; and
  generating a decrypted NDEF record comprising the decrypted NDEF record payload and an unencrypted NDEF record header of the corresponding encrypted NDEF record, the unencrypted NDEF record header being modified when a length of unencrypted NDEF record payload of the corresponding encrypted NDEF record is different than a length of the encrypted NDEF record payload of the encrypted NDEF record; and
 generating a decrypted NDEF message comprising one or more decrypted NDEF records.

8. The method of claim 7, wherein the at least one encryption key is associated with at least one of public key cryptography or symmetric key cryptography.

9. The method of claim 7, wherein the encrypted NDEF message is received from the second device via an NFC link.

10. The method of claim 7, wherein:
 the generating the decrypted NDEF record comprises:
  appending the decrypted NDEF record payload to the unencrypted NDEF recorder header for each of the one or more decrypted NDEF records, and
 the generating the decrypted NDEF message comprises:
  assembling the one or more decrypted NDEF records that each includes the decrypted NDEF record payload appended to the unencrypted NDEF record header.

11. An apparatus for wireless communication of a first device, comprising:
 means for establishing at least one encryption key with a second device;
 means for determining one or more unencrypted Near Field Communication (NFC) Forum Data Exchange Format (NDEF) records in an unencrypted NDEF message;
 for each of the one or more unencrypted NDEF records:
  means for extracting an unencrypted NDEF record payload from a corresponding unencrypted NDEF record;
  means for encrypting the unencrypted NDEF record payload into an encrypted NDEF record payload based at least in part on the at least one encryption key; and
  means for generating an encrypted NDEF record comprising the encrypted NDEF record payload and an unencrypted NDEF record header of the corresponding unencrypted NDEF record;
 means for modifying an unencrypted NDEF record header of at least one encrypted NDEF record of the one or more encrypted NDEF records when a length of an unencrypted NDEF record payload of the at least one encrypted NDEF record is different than a length of a corresponding encrypted NDEF record payload;
 means for generating an encrypted NDEF message comprising one or more encrypted NDEF records; and
 means for transmitting the encrypted NDEF message to the second device.

12. The apparatus of claim 11, wherein the at least one encryption key is associated with at least one of public key cryptography or symmetric key cryptography.

13. The apparatus of claim 11, wherein the encrypted NDEF message is transmitted to the second device via an NFC link.

14. The apparatus of claim 11, further comprising:
 means for receiving a request for a NDEF message from the second device; and
 means for generating the unencrypted NDEF message upon receipt of the request.

15. The apparatus of claim 11, wherein:
 the means for generating the encrypted NDEF record is configured to:
  append the encrypted NDEF record payload to the unencrypted NDEF recorder header for each of the one or more unencrypted NDEF records, and
 the generating the encrypted NDEF message comprises:
  assemble the one or more encrypted NDEF records that each includes the encrypted NDEF record payload appended to the unencrypted NDEF record header.

16. The apparatus of claim 11, wherein the encrypted NDEF record payload of the at least one encrypted NDEF record is a result of encrypting the unencrypted NDEF record payload.

17. An apparatus for wireless communication of a first device, comprising:
 means for establishing at least one encryption key with a second device in response to detecting presence of the second device;
 means for transmitting a request for a Near Field Communication (NFC) Forum Data Exchange Format (NDEF) message to the second device;
 means for receiving an encrypted NDEF message from the second device based on the request, the encrypted NDEF message comprising one or more encrypted NDEF records;
 for each of the one or more encrypted NDEF records:
  means for extracting an encrypted NDEF record payload from a corresponding encrypted NDEF record;
  means for decrypting the encrypted NDEF record payload into a decrypted NDEF record payload based at least in part on the at least one encryption key; and
  means for generating a decrypted NDEF record comprising the decrypted NDEF record payload and an unencrypted NDEF record header of the corresponding encrypted NDEF record, the unencrypted NDEF record header being modified when a length of unencrypted NDEF record payload of the corresponding encrypted NDEF record is different than a length of the encrypted NDEF record payload of the encrypted NDEF record; and
 means for generating a decrypted NDEF message comprising one or more decrypted NDEF records.

18. The apparatus of claim 17, wherein the at least one encryption key is associated with at least one of public key cryptography or symmetric key cryptography.

19. The apparatus of claim 17, wherein the encrypted NDEF message is received from the second device via an NFC link.

20. The apparatus of claim 17, wherein:
the means for generating the decrypted NDEF record is configured to:
append the decrypted NDEF record payload to the unencrypted NDEF recorder header for each of the one or more decrypted NDEF records, and
the generating the decrypted NDEF message comprises:
assemble the one or more decrypted NDEF records that each includes the decrypted NDEF record payload appended to the unencrypted NDEF record header.

21. An apparatus wireless communication of a first device, comprising:
a memory; and
at least one processor coupled to the memory and configured to:
establish at least one encryption key with a second device;
determine one or more unencrypted Near Field Communication (NFC) Forum Data Exchange Format (NDEF) records in an unencrypted NDEF message;
for each of the one or more unencrypted NDEF records:
extract an unencrypted NDEF record payload from a corresponding unencrypted NDEF record;
encrypt the unencrypted NDEF record payload into an encrypted NDEF record payload based at least in part on the at least one encryption key; and
generate an encrypted NDEF record comprising the encrypted NDEF record payload and an unencrypted NDEF record header of the corresponding unencrypted NDEF record;
modify an unencrypted NDEF record header of at least one encrypted NDEF record of the one or more encrypted NDEF records when a length of an unencrypted NDEF record payload of the at least one encrypted NDEF record is different than a length of a corresponding encrypted NDEF record payload;
generate an encrypted NDEF message comprising one or more encrypted NDEF records; and
transmit the encrypted NDEF message to the second device.

22. The apparatus of claim 21, wherein the at least one encryption key is associated with at least one of public key cryptography or symmetric key cryptography.

23. The apparatus of claim 21, wherein the encrypted NDEF message is transmitted to the second device via an NFC link.

24. The apparatus of claim 21, wherein the at least one processor is further configured to:
receive a request for a NDEF message from the second device; and
generate the unencrypted NDEF message upon receipt of the request.

25. The apparatus of claim 21, wherein:
the at least one processor is configured to generate the encrypted NDEF record by:
appending the encrypted NDEF record payload to the unencrypted NDEF recorder header for each of the one or more unencrypted NDEF records, and
the generating the encrypted NDEF message comprises:
assembling the one or more encrypted NDEF records that each includes the encrypted NDEF record payload appended to the unencrypted NDEF record header.

26. The apparatus of claim 21, wherein the encrypted NDEF record payload of the at least one encrypted NDEF record is a result of encrypting the unencrypted NDEF record payload.

27. An apparatus for wireless communication of a first device, comprising:
a memory; and
at least one processor coupled to the memory and configured to:
establish at least one encryption key with a second device in response to detection of presence of the second device;
transmit a request for a Near Field Communication (NFC) Forum Data Exchange Format (NDEF) message to the second device;
receive an encrypted NDEF message from the second device based on the request, the encrypted NDEF message comprising one or more encrypted NDEF records;
for each of the one or more encrypted NDEF records:
extract an encrypted NDEF record payload from a corresponding encrypted NDEF record;
decrypt the encrypted NDEF-record payload into a decrypted NDEF record payload based at least in part on the at least one encryption key; and
generate a decrypted NDEF record comprising the decrypted NDEF record payload and an unencrypted NDEF record header of the corresponding encrypted NDEF record, the unencrypted NDEF record header being modified when a length of unencrypted NDEF record payload of the corresponding encrypted NDEF record is different than a length of the encrypted NDEF record payload of the encrypted NDEF record; and
generate a decrypted NDEF message comprising one or more decrypted NDEF records.

28. The apparatus of claim 27, wherein the at least one encryption key is associated with at least one of public key cryptography or symmetric key cryptography.

29. The apparatus of claim 27, wherein the encrypted NDEF message is received from the second device via an NFC link.

30. The apparatus of claim 27, wherein the at least one processor is configured to:
generate the decrypted NDEF record by:
appending the decrypted NDEF record payload to the unencrypted NDEF recorder header for each of the one or more decrypted NDEF records, and
generate the decrypted NDEF message by:
assembling the one or more decrypted NDEF records that each includes the decrypted NDEF record payload appended to the unencrypted NDEF record header.

31. A non-transitory computer-readable medium storing computer executable code for wireless communication at a first device, the code when executed by at least one processor, causes the at least one processor to:
establish at least one encryption key with a second device;
determine one or more unencrypted Near Field Communication (NFC) Forum Data Exchange Format (NDEF) records in an unencrypted NDEF message;
for each of the one or more unencrypted NDEF records:

extract an unencrypted NDEF record payload from a corresponding unencrypted NDEF record;
encrypt the unencrypted NDEF record payload into an encrypted NDEF record payload based at least in part on the at least one encryption key; and
generate an encrypted NDEF record comprising the encrypted NDEF record payload and an unencrypted NDEF record header of the corresponding unencrypted NDEF record;
modify an unencrypted NDEF record header of at least one encrypted NDEF record of the one or more encrypted NDEF records when a length of an unencrypted NDEF record payload of the at least one encrypted NDEF record is different than a length of a corresponding encrypted NDEF record payload;
generate an encrypted NDEF message comprising one or more encrypted NDEF records; and
transmit the encrypted NDEF message to the second device.

32. The non-transitory computer-readable medium of claim 31, wherein the at least one encryption key is associated with at least one of public key cryptography or symmetric key cryptography.

33. The non-transitory computer-readable medium of claim 31, wherein the encrypted NDEF message is transmitted to the second device via an NFC link.

34. The non-transitory computer-readable medium of claim 31, further comprising code to:
receive a request for a NDEF message from the second device; and
generate the unencrypted NDEF message upon receipt of the request.

35. The non-transitory computer-readable medium of claim 31, wherein the code further causes the at least one processor to generate the encrypted NDEF record by:
appending the encrypted NDEF record payload to the unencrypted NDEF recorder header for each of the one or more unencrypted NDEF records, and
the generate the encrypted NDEF message by:
assembling the one or more encrypted NDEF records that each includes the encrypted NDEF record payload appended to the unencrypted NDEF record header.

36. The non-transitory computer-readable medium of claim 31, wherein the encrypted NDEF record payload of the at least one encrypted NDEF record is a result of encrypting the unencrypted NDEF record payload.

37. A non-transitory computer-readable medium storing computer executable code for wireless communication at a first device, the code when executed by at least one processor, causes the at least one processor to:
establish at least one encryption key with a second device in response to detection of presence of the second device;
transmit a request for a Near Field Communication (NFC) Forum Data Exchange Format (NDEF) message to the second device;
receive an encrypted NDEF message from the second device based on the request, the encrypted NDEF message comprising one or more encrypted NDEF records;
for each of the one or more encrypted NDEF records:
extract an encrypted NDEF record payload from a corresponding encrypted NDEF record;
decrypt the encrypted NDEF record payload into a decrypted NDEF record payload based at least in part on the at least one encryption key; and
generate a decrypted NDEF record comprising the decrypted NDEF record payload and an unencrypted NDEF record header of the corresponding encrypted NDEF record, the unencrypted NDEF record header being modified when a length of unencrypted NDEF record payload of the corresponding encrypted NDEF record is different than a length of the encrypted NDEF record payload of the encrypted NDEF record; and
generate a decrypted NDEF message comprising one or more decrypted NDEF records.

38. The non-transitory computer-readable medium of claim 37, wherein the at least one encryption key is associated with at least one of public key cryptography or symmetric key cryptography.

39. The non-transitory computer-readable medium of claim 37, wherein the encrypted NDEF message is received from the second device via an NFC link.

40. The non-transitory computer-readable medium of claim 37, wherein the code further causes the at least one processor to generate the decrypted NDEF record by:
appending the decrypted NDEF record payload to the unencrypted NDEF recorder header for each of the one or more decrypted NDEF records, and
generate the decrypted NDEF message by:
assembling the one or more decrypted NDEF records that each includes the decrypted NDEF record payload appended to the unencrypted NDEF record header.

* * * * *